United States Patent [19]

Weiser

[11] E Re. 28,517

[45] Reissued Aug. 12, 1975

[54] FILTER-TO-LINE TRANSIENT ISOLATOR

[75] Inventor: Earnest F. Weiser, Erie, Pa.

[73] Assignee: General Electric Company, Erie, Pa.

[22] Filed: July 1, 1974

[21] Appl. No.: 484,588

Related U.S. Patent Documents

Reissue of:

[64] Patent No.: 3,731,150
Issued: May 1, 1973
Appl. No.: 215,572
Filed: Jan. 5, 1972

[52] U.S. Cl. ..... 317/20; 317/33 SC
[51] Int. Cl. ..... H02h 7/10
[58] Field of Search ..... 317/20, 33 SC

[56] References Cited

UNITED STATES PATENTS 1,287,244 12/1918 Creighton ..... 317/20 X
3,323,017 5/1967 Powell et al. ..... 317/20

*Primary Examiner*—James D. Trammell
*Attorney, Agent, or Firm*—Dana F. Bigelow; Walter C. Bernkopf

[57] ABSTRACT

A device serially coupled between a wayside power source and the input filter of a chopper or inverter propulsion circuit, for attenuating the rate of charge and discharge of input filter capacitors to the wayside power source during the respective application and interruption of power to the input circuit. A saturable reactor in parallel with a resistor effectively switches the resistance into the circuit to impede current flow during periods of current in-rush or out-rush, and out of the circuit during periods of normal current flow.

8 Claims, 4 Drawing Figures

FILTER-TO-LINE TRANSIENT ISOLATOR

Matter enclosed in heavy brackets [ ] appears in the original patent but forms no part of this reissue specification; matter printed in italics indicates the additions made by reissue.

BACKGROUND OF THE INVENTION

This invention relates generally to circuit protective devices and more particularly to a device to protect against high current surges associated with high capacitance filters of railway power conversion systems.

Electric railway propulsion systems traditionally collect power from the wayside by continuous connection with either a pantograph or a third rail. At times transient currents much greater than the normal operating currents are caused to flow because of a fault in the system, such as a flashover on the armature of a propulsion motor. These currents are limited by the inductance and resistance of the line, and if their magnitude is extreme, a protective device, such as a circuit breaker, operates to terminate the flow of current.

An improved electric vehicle power supply system utilizes power conversion systems; i.e., choppers and inverters, intermediate the power source and the propulsion motors. These systems have input filters whose filter capacitors have an extremely large capacitance. Instantaneous current flow during the charging or discharging of these capacitors can be extremely high, and where a plurality of railway cars are involved, the total transient current is sufficient to cause the tripping of a circuit breaker and resultant interruption of duty.

Of principal concern are two conditions which generally occur to cause high transient currents. The first condition occurs with the initial energization of the wayside power line (third rail or pantograph). The capacitors in the input filter of each car simultaneously commence to charge, thereby causing an extremely high in-rush of current into each car and producing a total transient current sufficient to trip the substation line breakers.

The second condition which may occur is that of a short in the system such as would appear when a flashover occurs on an individual propulsion motor, or when the third rail is grounded. The resultant discharge of the filter capacitors on a plurality of cars causes a sudden out-rush of current to the fault with consequent activation of a line breaker.

One approach for controlling these transient currents would be to provide sufficient dissipative damping elements in the circuit to control all oscilations or perturbations adequately under all conditions and combinations. Permanent series resistance in the line or filters is undesirable because of power and performance loss. Unless inherent rail and other losses provide sufficient system damping under all circumstances, another approach must be implemented.

A series resistor with a mechanical contactor to shunt out the resistor during periods of steady state power flow can be utilized. However, the time required to operate the contractor is likely to be excessive, since the transient condition is most severe in the first few milliseconds.

It is therefore an object of this invention to provide for transient current control in an electrical railway system without unnecessary interruption of duty.

Another object of this invention is the provision of attenuating the in-rush of current when power is initially applied to the high capacity input filter of a traction vehicle power conversion system.

Yet another object of this invention is the provision for attenuating the out-rush of current from a power conversion input filter when its high capacitance filters suddenly discharge due to a fault in the system.

Still another object of this invention is the provision for a minimum of resistance and losses during normal operation of an electric propulsion system.

Another object is to reduce oscillations and transient voltages on equipment caused by in-rush during charging of the capacitors and reverse voltage caused by out-rush during discharge of the capacitors.

Another object is to utilize the normal filter reactor winding for the added function of in-and-out rush control thereby improving circuit efficiency and cost.

A further object of this invention is the provision for a transient current protective device which is responsive to change in current flow.

Yet another object of this invention is the provision for a transient current protective device which is simple, economical to manufacture, and reliable in use.

These object and other features and advantages become more readily apparent upon reference to the following description when taken in conjunction with the appended drawings.

SUMMARY OF THE INVENTION

The present invention limits transient current flow by utilizing a series resistor between the wayside power supply and the filter input. In parallel with the resistor is a magnetic saturating device which is responsive to the in-rush and out-rush of current from the filter capacitors. During initial energization of the system, a saturable reactor (or inductor) is provided to effectively switch in the series resistance to limit the in-rush of current to the charging capacitors. After completion of the charging, the reactor becomes saturated and effectively switches out the resistance to allow for steady state power flow.

Should the current flow be momentarily interrupted by a line fault, the sudden out-rush of current from the discharging capacitors is attenuated by the reactance of the inductor. The resistor will be switched in until the inductor becomes saturated in the opposite direction. The limitation of instantaneous current flow, therefore, prevents the activation of circuit breaker devices while still providing protection to the circuit against high currents. A separate reset circuit is provided for resetting the saturable reactor by discharging the filter capacitors toward the line side when the supply voltage is removed for an appreciable period of time.

In the drawings as hereinafter described a preferred embodiment is depicted; however, various other modifications and alternate construction can be made thereto without departing from the true spirit and scope of the invention.

DESCRIPTION OF THE PREFERRED EMBODIMENT

Figure 1:
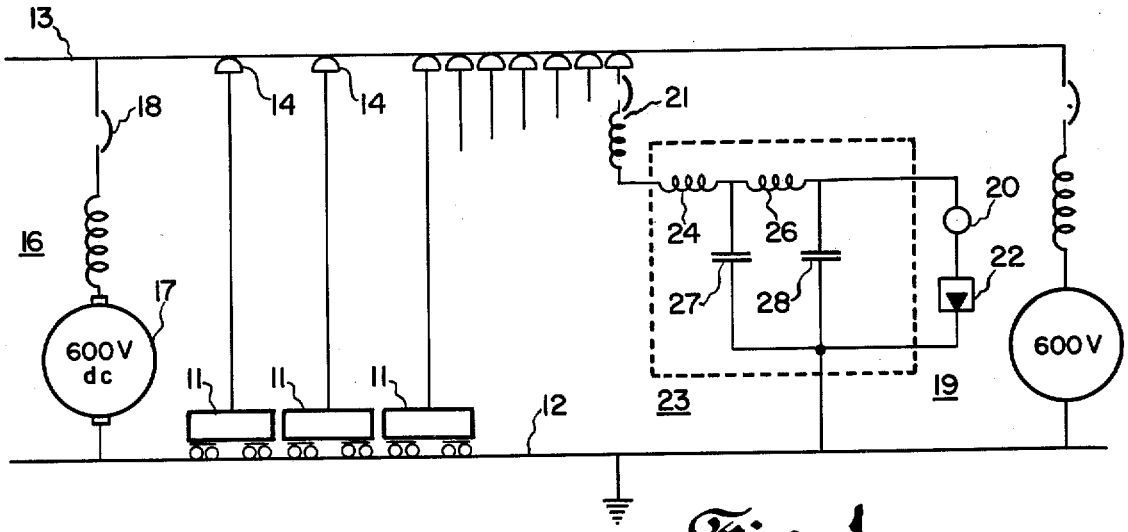
FIG. 1 is a schematic illustration of a railway wayside power system typical of that with which the subject invention is used.

Reference is now made to FIG. 1 which illustrates a typical electrical railway arrangement wherein a plurality of electrically propelled cars 11 operating on a track 12 are coupled to a wayside power line 13 by collectors 14. The power line 13 may be in the form of a third rail with shoes acting as collectors, or in the form of a pantograph making contact with the power line. A plurality of substations 16 are spaced along the track 12 and are coupled in parallel by the track and the power line, each of the substations 16 comprising a source of power such as a 600 volt DC generator 17, and a circuit breaker 18 to protect the circuit from high currents.

A power conversion circuit 19 is located in each car and comprises in serial connection a load 20 which is a plurality of traction motors, a car circuit breaker 21, and a power conversion unit 22, such as a chopper unit 22 used with DC motor systems, or an inverter unit used with AC motor propulsion systems.

With the use of such power conversion units, comes the requirement for an input filter 23 for stabilizing the pulsating current. The filter necessarily incorporates a capacitance and preferably in inductance. Although a single 1-c input filter may be used, a two-stage 1-c input filter, shown in FIG. 1, is preferred. The filter 23 comprises inductor 24 and 26 in series with the power conversion unit 22, and capacitors 27 and 28 in parallel therewith. The capacitors 27 and 28 must have a very high capacitance to properly filter the input to the load. This high capacitance can cause current flow in the system to become excessive so as to unnecessarily actuate the circuit breakers or cause harm to the circuit.

During normal steady state operation of the system, the filter capacitors are alternately charging and discharging, but they remain substantially in a charged condition with the discharge period lasting only a period of a few milliseconds. However, during periods in which the capacitors are being initially charged from the supply line 13, or being discharged back to the supply line 13, there occurs a flow of high currents that may be harmful.

A first situation occurs upon energization of the supply line 13 in the morning, as is commonly done. Transit car operation is cyclic in nature, with the peak loads occurring in the morning and late afternoon. In the evening the cars are typically transferred to a side track in the yard, and the power to the power line is deenergized. The capacitors 27 and 28 are partially discharged to the load 20 and are generally for safety's sake further discharged by means of a discharge circuit as will later be described. After storage the power line 13 is activated and the cars are again brought out for service. When the activation occurs, the capacitors of each one of the cars begin to charge, resulting in an excessive in-rush of current into the cars, with a total current flow sufficient to cause at least a tripping of the circuit breaker 18. The car circuit breaker 21 is generally designed so as to not be closed during initial energization. However, when a plurality of filters are simultaneously charged, the line circuit breaker 18 will most likely be tripped, resulting in loss of duty time. One solution contemplated involves the insertion of a series resistor to impede the flow of current during such a period, with a mechanical contactor being utilized to shunt the resistor. However, even though the time of operating the contactor would not be critical in the situation described hereinabove, it would be excessive in other situations described hereafter.

Having discussed the result of high currents during the charging of the filter capacitors, let's look at the situation wherein the capacitors are discharging to produce a large current flow. If a fault occurs in the system, either in the power line, or in one of the cars, such as by commutator flashover, the remainder of the cars will simultaneously discharge their capacitors, with the current flowing to the location of the fault. The total current outrush from all the cars is extremely high and should be controlled. The mechanical insertion of a series resistor would be of little help in limiting the current outflow since the transient condition would be the most severe during the first few milliseconds, and the time to operate the contractor, therefore, is likely to be excessive.

Figure 2:
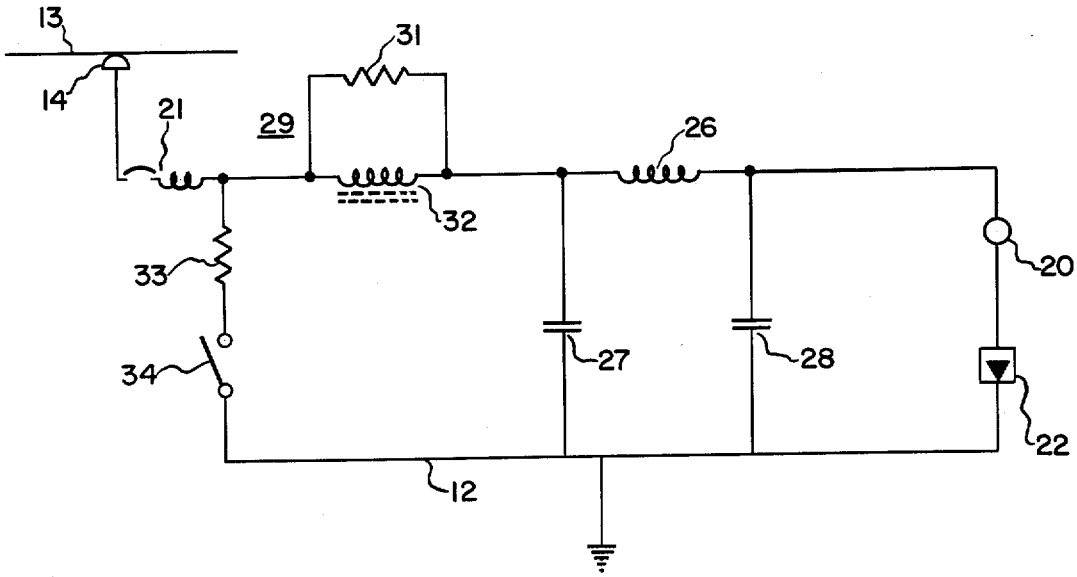
FIG. 2 is a circuit diagram of the preferred embodiment of the invention.

Referring now to FIG. 2, the static reactor switch used in the preferred embodiment of this invention is indicated generally at 29 and comprises, in series with the propulsion circuit, a resistor 31 and a saturable inductor 31 in parallel therewith. The resistor is of a low resistance value (e.g., 1 ohm), and is adapted to be switched into and out of the series circuit in response to the current flow therein.

The saturable inductor 32 is a modification of the inductor 24 employed in the conventional scheme of FIG. 1. A magnetic saturating core is added to the normal air core toroidal input reactor, with the saturation point set to control the current flow by attenuating the sudden out-rush and in-rush of current under conditions discussed hereinabove. The inductor 32 effectively switches in the resistance 31 during periods of current flow resulting from either the charging or the discharging of the capacitors, and switches out the resistance during periods of steady state current flow.

Figure 3:
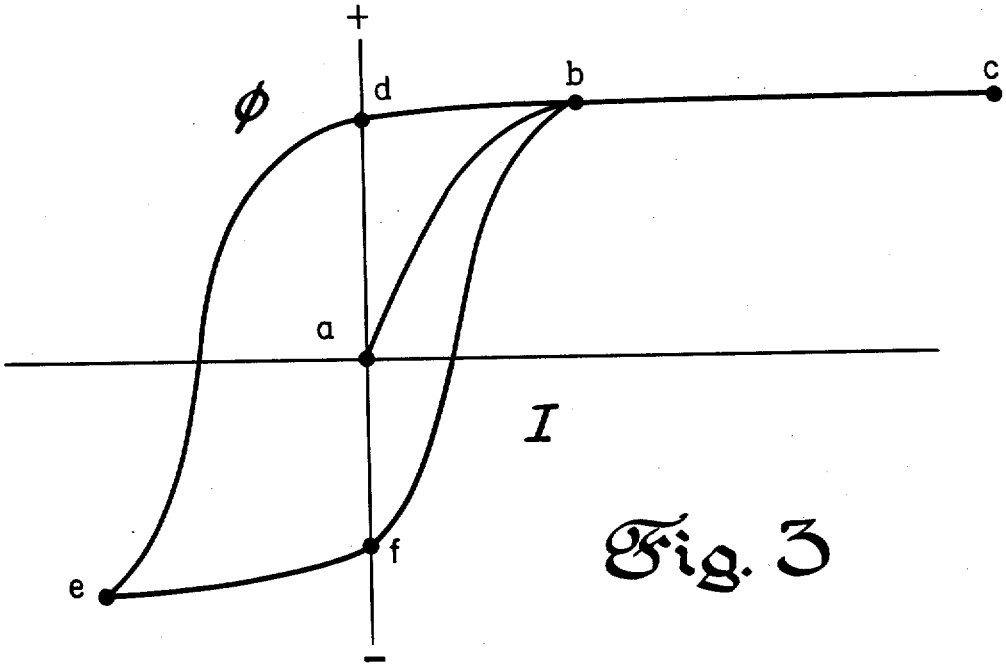
FIG. 3 illustrates a hysteresis loop used in the description of this invention.

A hysteresis loop is shown in FIG. 3 to indicate the value of the flux in the inductor 32 during the conditions of current flow to and from the filter. The instant that the power line is initially energized, or correspondingly when a motorman simultaneously closes all the line breakers in a train, a flux value in the inductor is 0 as indicated at point a. As the current rushes into each car, the flux-to-current relationship follows the curve to point b which represents the point of saturation of the magnetic core. Along this curve the counter EMF is represented by the equation:

$$E=Nd\phi/dt$$

During this period, the reactance of the inductor is therefore high enough to cause most of the incoming current to flow through the resistor 31 which limits the current flow to the charging capacitors.

At point b the core is saturated and its reactance due to the iron core becomes substantially 0 to allow the current to flow therethrough and effectively shunt out the resistor 31. At this point the capacitors are substantially charged and the in-rush of current is no longer extreme. The current is then allowed to gradually increase to point c as the load is increased at higher speeds. The flux remains positive and substantially constant at this saturation point, even when the current flow drops to 0 (point of d in FIG. 3) as when the vehicle is coasting.

When a fault occurs outside of the car, and the capacitors 27 and 28 instantly commence to discharge to the power line 13, the current flows in a negative direction and the flux and current relationship changes as indicated on the curve to point e. Along this curve the value of $d\phi/dt$ and hence the reactance is again high, and since the current is in the opposite direction, the reactance will cause the current to again flow through the resistor. Upon reaching point e wherein a negative saturation condition exists, current flow is no longer impeded and the resistor is again shorted out. But the capacitors 27 and 28 will have been substantially discharged by that time, and only a small current continues to flow out. The inductor 32 remains in this negatively saturated condition until the fault is corrected and the capacitors again commence to recharge. The current and flux in the inductor 32 then follow the curve to point b, during which time the current is shunted through the resistor to limit the in-rush thereof in a manner similar to that of the initial charging. The saturable inductor 32 thus acts as a highly responsive switch to introduce and remove the resistor from the circuit at the appropriate current flow conditions.

When the cars are de-energized as when they are moved to a parking track in the evening, the filter capacitors 27 and 28 are discharged toward the line side so that the inductor flux condition again returns to point a in FIG. 3. This discharging is normally done for safety purposes when the car is de-energized for service or storage. The arrangement shown in FIG. 2 provides for a resetting of the saturable inductor 32 by the discharging of the capacitors. A filter discharge resistor 33 and a normally open contactor 34 are provided to complete a discharge circuit, so that when the contactor 34 is closed, the capacitors discharge toward the line and flow counterclockwise through the resistor 33 to bring the flux in the inductor to a negative value (point f in FIG. 3).

Another condition which commonly occurs in a wayside power line arrangement is that of unpredictable voltage supply variations caused by rail gaps, shoe arching, and other similar occurrences. If the power is removed from the contactors for only a short duration, the capacitors commence to discharge to the load, the propulsion load is electronically shut off, and the inductor is not affected as the power supply is restored and the capacitors are recharged. However, if the current supply is interrupted for a longer period of time the capacitors will automatically be discharged by operation of the contactor 34, and the inductor 32 will be reset to offer a high reactance in response to the in-rush of current when power is restored and the capacitors commence to recharge.

Figure 4:
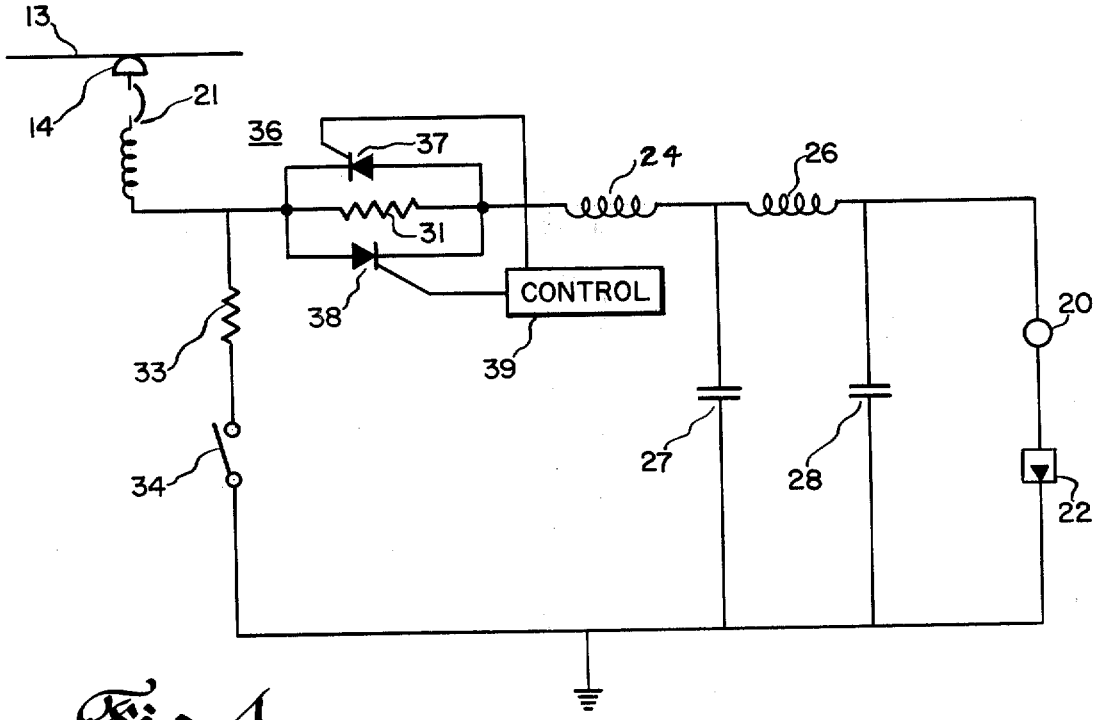
FIG. 4 is a circuit diagram of a modified embodiment of the invention.

A modified embodiment of the invention is shown in FIG. 4 with a thyristor switch 36 used to selectively insert and remove the series resistor 31 from the circuit. A pair of oppositely poled silicon controlled rectifiers 37 and 38 are connected in parallel with the resistor 31 and a control unit 39 selectively gates them in response to the current flow so as to limit transient currents in a manner similar to that described above.

What is claimed as new and desired to secure by Letters Patent of the United States is:

1. An improved protective circuit for limiting a line in-rush and out-rush of current from a propulsion system input filter, wherein the current flow between a DC power source and the filter is selectively attenuated and alternatively unattenuated to enable drawing power without a loss, wherein the improvement comprises:

a. a static power conversion unit for converting direct current from the DC power source [into alternating current;]

b. a filter connected between said power conversion unit and said DC power source for filtering the ripple voltage from said power conversion unit and ripple current from said DC power source, said filter comprising at least one capacitor in parallel with said power conversion unit and at least one reactor in series with said power conversion unit and power source, said reactor having both a saturable core portion and a non-saturable core portion; and c. means for occasionally and alternately charging and discharging said capacitor through said reactor; wherein said reactor is so constructed that during periods of charging of said capacitor the flux in said saturable core portion moves toward a condition of positive saturation and during periods of discharging of said capacitor [and] *the* flux therein moves toward a condition of negative saturation, thereby providing during these periods an inductive reactance to substantially attenuate the current flow through said saturable core portion, whereas during periods of steady state current inflow, subsequent to the charging of said capacitor, said saturable core portion remains saturated to allow for the substantially unimpeded flow of current therethrough, and said non-saturable core portion offers a relatively small fixed reactance, which combines with that of said capacitor to perform the filtering function.

2. A protective circuit as set forth in claim 1 and including an impedance element connected in parallel with said reactor, the impedance of said impedance element being of a magnitude such that during periods of charging and discharging of said capacitor the current flow is directed from said saturable core portion to flow through said impedance element.

3. A protective circuit as set forth in claim 1 wherein said non-saturable core portion comprises an air core reactor.

4. A protective circuit as set forth in claim 1 wherein said charging and discharging means includes:

a. a current limiting controlled conductive means coupled in series between a first point intermediate said power source and said reactor and a second point on the return side of said capacitor, said conductive means adapted to be non-conductive during normal operation of the propulsion system and to conduct current subsequent to the shutdown thereof, to discharge said filter capacitor toward said power supply and thereby cause the flux of said reactor to move toward a condition of negative saturation.

5. A protection circuit for limiting current flow between a power source and a capacitor filter during periods of charge and discharge of the filter capacitor comprising:

a. a DC power source;

b. a static power conversion unit connected thereto for converting direct current from said DC power source [ into alternating current;]

c. a capacitor connected in parallel with said power conversion unit for filtering the ripple voltage therefrom;

d. a reactor coupled in series between said DC power source and said capacitor, said reactor comprising a non-saturable core portion for filtering ripple current from said DC power source and ripple voltage from said power conversion unit, and a saturable core portion; and e. means for occasionally and alternately charging and discharging said capacitor through said reactor; wherein said reactor is so constructed that during periods of charging of said capacitor, the flux in said saturable core portion moves toward a condition of positive saturation and during periods of discharging of said capacitor the flux therein moves toward a condition of negative saturation, thereby providing during these periods an inductive reactance to substantially attenuate the current flow through said saturable core portion, whereas during periods of steady state current inflow, subsequent to the charging of said capacitor, said saturable core portion remains saturated to allow for the substantially unimpeded flow of current therethrough; and said non-saturable core portion offers a relatively small fixed reactance, which combines with that of said capacitor to perform the filtering function.

6. A protective circuit as set forth in claim 5 and including an impedance connected in parallel with said reactor element for attenuating current flow directed from said reactor element during periods of charging and discharging of said capacitor.

7. A protective circuit as set forth in claim 5 wherein said non-saturable core portion comprises an air core reactor.

8. A protective circuit as set forth in claim 5 wherein said charging and discharging means includes:

a. a current limiting controlled conductive means coupled in series between a first point intermediate said power source and said reactor and a second point on the return side of said capacitor, said conductive means adapted to be non-conductive during normal operation of the propulsion system and to conduct current subsequent to the shutdown thereof, to discharge said filter capacitor toward said power supply and thereby cause the flux of said reactor to move toward a condition of negative saturation.

* * * * *